Patented Dec. 1, 1942

2,303,691

UNITED STATES PATENT OFFICE 2,303,691

METHOD OF TREATING RUBBER

Marion W. Harman, Nitro, W. Va., assignor to Monsanto Chemical Company, St. Louis, Mo., a corporation of Delaware No Drawing. Application April 5, 1940, Serial No. 328,086

12 Claims. (Cl. 260—761)

This invention relates to new and improved rubber articles and improvements in the treatment of rubber and more particularly to a method of plasticizing rubber.

In the manufacture of rubber articles it is desirable to attain a certain degree of plasticity of the rubber in order to facilitate the incorporation of compounding and vulcanizing ingredients and in order to provide a stock which is amenable to shaping in the form desired. For example tubing operations require a relatively plastic rubber. Mechanical mastication alone may be resorted to for the plasticization of rubber but this is a time consuming operation and furthermore excessive mechanical manipulation results in a permanent breakdown of the rubber. The internal structure is disturbed so that the cured rubber products exhibit low tensile strengths and poor elasticity.

It is an object of this invention to provide a class of materials which, when added to rubber, will materially increase its rate of plasticization during mastication. A further object of this invention is to achieve a saving of time and power consumed in ordinary mechanical plasticization of rubber. A still further object is to provide vulcanizates of improved physical properties. Other objects are to provide new compositions of matter and to provide a softened or broken down rubber of desirable physical properties. Still other objects will be apparent from the following description.

In accordance with this invention rubber is subjected to the action of a small proportion of a dithio biazolone sulfhydrate possessing the probable structural formula,

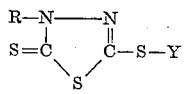

wherein R is an organic radical as for example an alkyl aryl, aralkyl or alicyclic group and Y is hydrogen or an acyl group. Preferably, R is an aromatic radical, especially an aromatic hydrocarbon radical since strongly basic or acidic substituents tend to diminish or even destroy the softening effect. Likewise the metallic salts of dithio biazolone sulfhydrates are in general ineffective but may of course be employed in conjunction with sufficient acidic material to liberate the free sulfhydrate. However, as noted above the acyl derivatives possess the desirable properties of the class. Typical examples of suitable acyl substituents comprise benzoyl, acetyl, propionyl and the like groups. Examples of organic radicals represented by R in the above formula comprise decyl, lauryl, acetyl, benzyl, cyclohexyl, nitrophenyl, chlorphenyl and p-amino phenyl but preferably aromatic hydrocarbon radicals as for example phenyl, αnaphthyl, βnaphthyl, p-biphenyl, o-biphenyl, o-tolyl and xylyl.

Dithio biazolone sulfhydrates are well known chemical compounds and may be prepared by the method described by Max Busch in the Berichte der Deutschen Chemischen Gesellschaft, vol. 27, page 2511. However, it is to be understood that this invention is not limited to a particular method of preparation.

The new softening agents are advantageously incorporated into rubber during the milling operation and the rubber subjected to such further action as is sufficient to attain the plasticity desired. In general from 0.25 to 1.0 part by weight on the rubber are adequate for most purposes but other proportions may be employed where desired. Material amounts of sulfur as well as zinc oxide and other basic ingredients have been found to diminish the plasticizing action. It is preferred therefore to incorporate the dithio biazolone sulfhydrates of this invention prior to the addition of compounding and/or vulcanizing ingredients. Of course where increased plasticity is of no concern but it is desired to take advantage of the improved properties imparted to the vulcanizates by the compounds of this invention, the method of their addition to the rubber is immaterial.

The following specific embodiments of the invention illustrate the desirable properties of the new softening or plasticizing agents but are not to be regarded as limitative of the invention.

A quantity of smoked sheets of rubber was milled for a short period in order to assure uniformity of the rubber. Rubber stocks were then compounded comprising,

|  | Stock | | | | | | |
|---|---|---|---|---|---|---|---|
|  | A | B | C | D | E | F | G |
|  | Parts by weight | Parts by weight | Parts by weight | Parts by weight | Parts by weight | Parts by weight | Parts by weight |
| Smoked sheets of rubber | 100 | 100. | 100. | 100. | 100. | 100. | 100. |
| Phenyl dithio biazolone sulfhydrate |  | 0.25 | 0.5 | 1.0 |  |  |  |
| Benzoyl derivative of phenyl dithio biazolone sulfhydrate |  |  |  |  | 0.25 | 0.5 | 1.0 |

The stocks so compounded were tested in an extrusion plastometer the same day as milled and at various intervals thereafter. A description of the method and apparatus employed is given in an article by J. H. Dillon in Rubber Chemistry and Technology, volume 9 (1936), pages 496-501. The plasticity figures which appear in the table below represent the time in seconds required to extrude a definite volume of rubber under constant temperature and pressure.

*Table I*

| Stock | Plasticity figures in seconds | | | |
|---|---|---|---|---|
| | Same day as milled | 3 days after milling | 6 days after milling | 7 days after milling |
| A | 126 | 129 | 142 | 150 |
| B | 81 | 82 | 81 | |
| C | 61 | 69 | 74 | |
| D | 40 | 42 | | 42 |
| E | 86 | 85 | 90 | |
| F | 66 | 81 | 85 | |
| G | 60 | 57 | | 62 |

The above data show that the incorporation of a small proportion of a dithio biazolone sulfhydrate into crude rubber brings about a remarkable increase in the plasticity. It will be further noted that rubber products of increasingly greater plasticity are obtained by employing higher proportions of softener.

The vulcanizates obtained by heating rubber, sulfur and an accelerator in the presence of a dithio biazolone sulfhydrate exhibit physical properties superior to those of vulcanizates cured in the absence of the preferred materials. For example the preferred class of materials impart exceptional abrasion resistance to vulcanized rubber products. Improvements of the order of 30% over similar stocks cured in the absence of the preferred materials have been observed. In addition, where a mercapto thiazole is employed as the accelerator, higher modulus stocks result from curing in the presence of a dithio biazolone sulfhydrate. In this connection, some of the compounds of this invention have been proposed as accelerators of vulcanization, however they have no commercial significance in this regard and by the term "accelerator" as employed in the present specification, is meant those materials commonly used for the vulcanization of rubber. As specific examples of the desirable properties imparted to vulcanizates by the preferred materials rubber stocks were compounded comprising,

| | Stocks | |
|---|---|---|
| | H | J |
| | Parts by weight | Parts by weight |
| Smoked sheets of rubber | 100. | 100. |
| Carbon black | 45. | 45. |
| Zinc oxide | 5. | 5. |
| Sulfur | 3. | 3. |
| Stearic acid | 3. | 3. |
| Pine Tar | 2. | 2. |
| Mercaptobenzothiazole | 0.75 | 0.75 |
| Condensation product of p-amino diphenyl and acetone | 1.0 | 1.0 |
| Phenyl dithio bizaolone sulfhydrate | | 0.5 |

The stocks so compounded were vulcanized by heating for different periods of time at the temperature of thirty pounds steam pressure per square inch. The following are the modulus and tensile properties of the cured rubber stocks:

*Table II*

| Stock | Cure time in mins. | Modulus of elasticity in lbs/.in.$^2$ at elongations of— | | Tensile at break in lbs./in.$^2$ | Ult. elong. per cent |
|---|---|---|---|---|---|
| | | 200% | 400% | | |
| H | 75 | 1035 | 2675 | 3980 | 555 |
| J | 75 | 1055 | 2870 | 3970 | 530 |
| H | 90 | 1010 | 2650 | 3985 | 545 |
| J | 90 | 1165 | 3000 | 3950 | 520 |

The above data show that the modulus of elasticity of a rubber product prepared by heating rubber and sulfur in the presence of a mercapto thiazole accelerator is increased by the presence of the preferred class of materials.

As further exemplary of the improved physical properties imparted to vulcanizates cured in the presence of the preferred class of materials, the abrasion resistance of the above rubber products (stocks H and J) was determined and found to be markedly superior in the case of the rubber vulcanized in the presence of phenyl dithio biazolone sulfhydrate. Abrasion resistance was determined by maintaining the rubber in contact with an abrasive wheel and measuring the volume of rubber worn away as well as the power consumed. A description of the apparatus and the method of carrying out the test may be found on pages 48-50, Method B, of A. S. T. M. Standards on Rubber Products, November, 1937 published by the American Society for Testing Materials. The results are given in the following table, the lower numbers indicating a smaller volume of rubber worn away or a higher abrasion resistance.

*Table III*

| Stock | Cure—time in minutes | Abrasion index |
|---|---|---|
| H | 75 | 201 |
| J | 75 | 140 |
| H | 90 | 176 |
| J | 90 | 128 |

The above data show that the volume of rubber lost upon abrasion is materially decreased by the incorporation of the preferred class of materials.

As a further specific embodiment of the invention 0.25 and 0.50 part by weight of p-xenyl dithio biazolone sulfhydrate, a cream colored solid melting at 144-146° C. were incorporated into smoked sheets of rubber on a mill and the plasticity of the stocks so compounded compared to that of the untreated rubber by means of an extrusion plastometer. The time in seconds required to extrude a given volume of rubber under constant pressure was recalculated on the basis of rubber as 100. The data are given below:

*Table IV*

| Plasticizer—parts by weight | Plasticity figure |
|---|---|
| None | 100. |
| 0.25 | 39.4 |
| 0.50 | 26.0 |

The above data show the desirable plasticizing action of the preferred class of materials.

It is evident from the above description and specific examples that a variety of improvements in the treatment of rubber, particularly in plasticizing rubber, may be achieved by the incorporation into rubber of the compounds of this invention. Again the preferred materials may be employed in different proportions than specifically shown.

The present invention is limited solely by the claims attached hereto as part of the specification.

What is claimed is:

1. In the manufacture of rubber articles the step of subjecting the unvulcanized rubber to the action of a compound possessing the structure

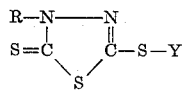

wherein R represents an aromatic radical free from strongly acidic or basic groups and Y is selected from a group consisting of hydrogen and acyl radicals in the absence of sufficient sulfur and basic material to neutralize the action of said compound, for a sufficient length of time for said compound to effect a marked decrease in the resistance of the rubber to flow over that which the rubber would have if subjected to the same conditions in the absence of said compound.

2. In the manufacture of rubber articles the step of subjecting the unvulcanized rubber to the action of a dithio biazolone sulfhydrate containing an aromatic radical free from strongly acidic or basic groups, linked to a nitrogen atom of the dithio biazolone nucleus in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

3. In the manufacture of rubber articles the step of subjecting the unvulcanized rubber to the action of a dithio biazolone sulfhydrate containing an aromatic hydrocarbon radical linked to a nitrogen atom of the dithio biazolone nucleus in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

4. In the manufacture of rubber articles the step of subjecting the unvulcanized rubber to the action of phenyl dithio biazolone sulfhydrate in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

5. In the manufacture of rubber articles the step of subjecting the unvulcanized rubber to the action of the benzoyl ester of phenyl dithio biazolone sulfhydrate in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

6. In the manufacture of rubber articles the step of subjecting the unvulcanized rubber to the action of p-xenyl dithio biazolone sulfhydrate in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

7. Unvulcanized rubber of increased plasticity obtained by subjecting the unvulcanized rubber to the action of a compound possessing the structure

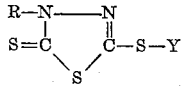

wherein R represents an aromatic radical free from strongly acidic or basic groups and Y is selected from a group consisting of hydrogen and acyl radicals in the absence of sufficient sulfur and basic material to neutralize the action of said compound, for a sufficient length of time for said compound to effect a marked decrease in the resistance of the rubber to flow over that which the rubber would have if subjected to the same conditions in the absence of said compound.

8. Unvulcanized rubber of increased plasticity obtained by subjecting the unvulcanized rubber to the action of a dithio biazolone sulfhydrate containing an aromatic radical free from strongly acidic or basic groups, linked to a nitrogen atom of the dithio biazolone nucleus in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

9. Unvulcanized rubber of increased plasticity obtained by subjecting the unvulcanized rubber to the action of a dithio biazolone sulfhydrate containing an aromatic hydrocarbon radical linked to a nitrogen atom of the dithio biazolone nucleus in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

10. Unvulcanized rubber of increased plasticity obtained by subjecting the unvulcanized rubber to the action of phenyl dithio biazolone sulfhydrate in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

11. Unvulcanized rubber of increased plasticity obtained by subjecting the unvulcanized rubber to the action of the benzoyl ester of phenyl dithio biazolone sulfhydrate in the absence of sufficient sulfur and basic material to neutralize the action of the said dithio biazolone sulfhydrate, for a sufficient length of time for said dithio biazolone sulfhydrate to effect a marked decreased in the resistance of the rubber to flow over that which the ruber would have if subjected to the same conditions in the absence of said dithio biazolone sulfhydrate.

12. Unvulcanized rubber of increased plasticity obtained by subjecting the unvulcanized rubber to the action of p-xenyl dithio biazolone sulfhydrate in the absence of sufficient sulfur and basic material to neutralize the action of the said dithio biazolone sulfhydrate, for a sufficient length of time for said dithio biazolone sulfhydrate to effect a marked decrease in the resistance of the rubber to flow over that which the rubber would have if subjected to the same conditions in the absence of said dithio biazolone sulfhydrate.

MARION W. HARMAN.